United States Patent
Krampe et al.

(10) Patent No.: US 12,156,490 B2
(45) Date of Patent: Dec. 3, 2024

(54) DISTRIBUTOR DEVICE FOR SOLIDS-CONTAINING LIQUIDS

(71) Applicant: VOGELSANG GMBH & CO. KG, Essen (DE)

(72) Inventors: Paul Krampe, Essen (DE); Carsten Lucks, Essen (DE); Thies Petersen, Essen (DE)

(73) Assignee: VOGELGSANG GMBH & CO KG, Essen (DE)

( * ) Notice: Subject to any disclaimer, the term of this patent is extended or adjusted under 35 U.S.C. 154(b) by 640 days.

(21) Appl. No.: 17/414,424

(22) PCT Filed: Dec. 17, 2019

(86) PCT No.: PCT/EP2019/085708
§ 371 (c)(1),
(2) Date: Jun. 16, 2021

(87) PCT Pub. No.: WO2020/127310
PCT Pub. Date: Jun. 25, 2020

(65) Prior Publication Data
US 2022/0087098 A1    Mar. 24, 2022

(30) Foreign Application Priority Data

Dec. 17, 2018  (DE) .................. 20 2018 107 208.0

(51) Int. Cl.
*A01C 23/00*   (2006.01)
*A01C 3/06*    (2006.01)
*B02C 18/22*   (2006.01)

(52) U.S. Cl.
CPC .............. *A01C 23/002* (2013.01); *A01C 3/06* (2013.01); *A01C 23/003* (2013.01); *B02C 18/2216* (2013.01)

(58) Field of Classification Search
CPC ... A01C 23/002; A01C 23/003; A01C 23/008; A01C 23/022; A01C 3/06; B02C 18/2216; B02C 18/06; B02C 18/0092
See application file for complete search history.

(56) References Cited

U.S. PATENT DOCUMENTS

| 11,026,365 B2 | 6/2021 | Krampe et al. |
| 2006/0042703 A1 | 3/2006 | Huffman |

(Continued)

FOREIGN PATENT DOCUMENTS

| DE | 29715481 | 1/1998 |
| EP | 2850928 | 3/2015 |

(Continued)

*Primary Examiner* — Christopher R Dandridge
(74) *Attorney, Agent, or Firm* — PRICE HENEVELD LLP

(57) ABSTRACT

A distributor device for solids-containing liquids includes a distribution chamber with an inlet opening which leads to a chamber interior space of the distribution chamber, wherein the distribution chamber has a first end wall with several connection ports and a first side wall arranged laterally to the end wall. The distributor device also includes a connecting part connecting the rotor and the blade drive shaft, which connecting part is detachably connected to the rotor and/or to the blade drive shaft, wherein a movement of the rotor is guided by the connecting part relative to the first perforated blade disk. The distribution chamber has at least one closable opening which is located in the first side wall, wherein the opening is designed at least so large that the rotor is removable from the distribution chamber through the opening.

24 Claims, 4 Drawing Sheets

(56) References Cited

U.S. PATENT DOCUMENTS

| | | |
|---|---|---|
| 2019/0210034 A1 | 7/2019 | Burhorst |
| 2019/0366352 A1 | 12/2019 | Burhorst et al. |
| 2019/0374953 A1 | 12/2019 | Burhorst et al. |
| 2020/0130003 A1 | 4/2020 | Hudepohl |
| 2021/0162325 A1 | 6/2021 | Krampe |

FOREIGN PATENT DOCUMENTS

| | | | | |
|---|---|---|---|---|
| EP | 3175696 | | 6/2017 | |
| EP | 3175696 A1 | * | 6/2017 | ........... A01C 23/002 |
| FR | 2851482 | | 8/2004 | |
| FR | 2851482 A1 | * | 8/2004 | ........... A01C 23/002 |
| JP | H03201907 | | 9/1991 | |
| JP | 2008238021 | | 10/2008 | |

\* cited by examiner

DISTRIBUTOR DEVICE FOR SOLIDS-CONTAINING LIQUIDS

CROSS-REFERENCE TO FOREIGN PRIORITY APPLICATION

The present application claims the benefit under 35 U.S.C. §§ 119(b), 119(e), 120, and/or 365(c) of PCT/EP2019/085708 filed Dec. 17, 2019, which claims priority to German Application No. 20 2018 107 208.0 filed Dec. 17, 2018.

FIELD OF THE INVENTION

The invention relates to a distributor device for solids-containing liquids, comprising a distribution chamber with an inlet opening which leads to a chamber interior space of the distribution chamber, wherein the distribution chamber has a first end wall with several connection ports and a first side wall arranged laterally to the end wall, a first perforated blade disc with several outlet openings that connect the chamber interior space to the several connection ports, a blade drive shaft, which is rotatably mounted about a drive shaft axis, a rotor that is coupled to the blade drive shaft for transmitting a torque about the blade drive shaft, a first cutting blade which is connected to the rotor and has one cutting edge which rests against the perforated blade disc and is movable relative to the perforated blade disc by means of the rotor, and a clamping device which is designed to effect a contact force between the first cutting blade and the first perforated blade disc and which is preferably detachably connected to the rotor. Furthermore, the invention relates to a method for maintaining a distributor device for solids-containing liquids.

BACKGROUND OF THE INVENTION

A typical field of application for such distributor devices is found in agricultural engineering, where many applications require to distribute liquids that carry solids from one line to several lines, for example to spread slurry as a nutrient reservoir on a field via a dribble bar.

A fundamental problem that arises with such distributor devices is due to the fact that the solids-laden liquid has to be distributed from a feed line with a large cross section to several feed lines, each with a small cross section, due to the system. Due to the solids in the liquid, there is a risk of clogging in the small cross sections in this system-related process. It is known in principle to integrate a cutting device in distributor devices for solids-laden liquids in order to solve this problem. By means of such a cutting device the solids in the liquid are broken up, which reduces the risk of clogging in the small passage cross sections in or downstream of the distributor device. From EP 2850 928 B1 a cutting device integrated in the distributor device is known, which has cutting blades that, in cooperation with a perforated disc, exert a shear action on the solids as they pass through the outlet openings of the perforated disc. Here, the cutting blade is moved relative to the perforated disc to create this shear action. Here, the outlet openings in the perforated disc correspond with the outlet openings of the distributor device and are in fluid communication with these outlet openings. DE 297 15 481 U1 describes a device for distributing inhomogeneous liquids on agricultural land, consisting of one or more distributors connected to the tank of a slurry tanker and of a plurality of discharge lines connected to them.

Another problem that arises with distributor devices of the type mentioned above is the wear of the cutting edges of the cutting blades. A wear of the cutting edges, which occurs with increasing duration of use, causes the cutting ability of the edges to decrease and the solids can no longer be broken up as intended, which can lead to blockages inside the distribution chamber and in the outlet openings or the hoses. As a result, the functioning of the distributor device is limited or the distributor device is no longer functional at all, whereby regular renewal of the cutting edges or the cutting blades are required. From EP 2850 928 B1 a distributor device is known, in which an exchange of the components, which are in a distribution chamber, is possible. Here, the cutting knives are attached to the rotor on its two axial end faces and, for the cutting action, rest against perforated blade plates that are attached to an end wall. To remove the rotor from the blade drive shaft, it is possible to dismount the end wall so that the rotor can be pulled off axially along the blade drive shaft. The rotor, to which the cutting blades are attached, can then be detached from the blade drive shaft and removed from the distribution chamber axially along the blade drive shaft. A disadvantage of this design is that the rotor with the cutting blades attached to it can only be removed from the distribution chamber with difficult handling in the application area. Due to the large number of connected hoses, the mobility of the end wall is also severely restricted and thus a great amount of force and time is required to remove the end wall and to remove the rotor out of the distribution chamber. Furthermore, the number of additional elements on distributor devices is increasing due to the growing requirements for precise application of fertilizers, such as slurry. To enable precise management ("precision farming") and, for example, to precisely ensure that an application of fertilizers, variably controllable in terms of application width by means of a part width control system, a large number of pneumatic valves and electrical sensors are required in the area of the outlet openings. The advantage of a central arrangement of these valves with good accessibility is countered by the disadvantage that this results in cramped installation space conditions and makes maintenance or repair work more difficult or involves considerable effort.

There is, therefore, a need to design the distributor device in such a way that it is possible to replace the cutting blades with less force and time effort.

SUMMARY OF THE INVENTION

According to the invention, these problems are solved by a distributor device with the features of the present disclosure. The device is characterized in that it comprises a connecting part connecting the rotor and the blade drive shaft, which connecting part is detachably connected to the rotor and/or to the blade drive shaft, wherein a movement of the rotor is guided by the connecting part relative to the first perforated blade disc, and the distribution chamber has at least one closable opening which is located in a side wall of the distributor device, wherein the opening is designed at least so large that the rotor is removable from the distribution chamber through the opening.

Thereby, the inlet opening designates the opening in the distribution chamber through which a solids-containing liquid is introduced into the distribution chamber, preferably by means of a connected hose. The solids-containing liquid is discharged from the distribution chamber via the connection ports, preferably by means of hoses connected thereto. The drive shaft axis is defined as a virtual line which runs along the rotation axis of the blade drive shaft and represents the axis of rotation of the blade drive shaft. According to the invention, a rotor is understood to be a component that is connected to a cutting blade at one end face. The rotor is set in motion and as a result the cutting blade connected to the rotor moves along a movement path. The connecting part guides this movement of the rotor. This guidance can be effected, for example, by the connecting part fixing the rotor to a drive shaft. According to the invention, a movement path may be interpreted, for example, as a circular path or an eccentric path. The cutting blade has at least one cutting edge, which rests against the first perforated blade disc. The perforated blade disc is preferably a plate planar on the side facing the rotor, which has several openings through which the fluid can flow from the distribution chamber to the connection ports. These openings form opening cutting edges by their edge on the side facing the cutting blade. According to the invention, the cutting blade is moved relative to the perforated blade disc and thereby causes a cutting effect by shearing the cutting edge of the cutting blade at the opening cutting edges of the openings in the perforated blade disc. The clamping device is designed in such a way that a pressure force is formed between the cutting blade and the perforated blade disc, in particular, this pressure force can be adjusted by means of the clamping device.

The connecting part is connected to the rotor and/or the drive shaft in such a way that it guides the rotor around the drive shaft axis in relation to the drive shaft and consequently cannot be moved radially away from the blade drive shaft in relation to the drive shaft axis when the connecting part is mounted. After loosening, partial or complete disassembly of the connecting part, this guidance about the drive shaft axis is cancelled according to the invention, so that the rotor can be moved radially with respect to the drive shaft axis. According to the invention, the rotor can, when the connecting part is not connected to the rotor and/or the blade drive shaft, thus by radial movement be removed from the distribution chamber. This preferably occurs without an axial movement of the rotor necessary for this. However, an axial movement along the drive shaft axis can also take place by a short distance, wherein such a short distance is understood to be a distance which is less than 10%, in particular less than 5% of the axial length of the distribution chamber along the drive shaft axis or perpendicular to the perforated blade disc—in absolute values preferably less than 5 cm, less than 2.5 cm, and, in particular, less than 1 cm or 0.5 cm. Thereby, according to the invention, it becomes possible to attach and detach the rotor in such a way that, on the one hand, it is securely guided on the blade drive shaft when the connecting part is mounted, on the other hand, radially movable and thus laterally removable when the connecting part is detached/disassembled. Thus, the rotor can be removed from an opening provided for this purpose in the side wall of the distribution chamber. This opening is preferably closable by means of a cover which is detachably connected to the distribution chamber.

The present invention offers the advantage that the end wall with the connected hoses does not have to be detached from the distribution chamber, and the cutting blades are accessible more easily and with considerably less force and time effort compared to existing distributor devices. For this purpose, the opening in the side wall can be used. Due to the detachable connecting part, the connection between the rotor and the blade drive shaft is simple and detachable in such a way that a radial removal of the rotor through the opening is possible.

Furthermore, the invention offers further advantages compared to known devices in that the end wall does not have to be detached from the distribution chamber during its entire service life. Thus, when mounting the end wall, a sufficiently good plane parallelism can be established between the end wall and thus also between the perforated blade disc and the cutting blades. At the same time, the plane parallelism is maintained over the entire service life, since no disassembly and reassembly of the end wall is necessary and the one-time assembly is carried out under controlled conditions, in particular, with clean surfaces, new seals, and suitable tools, during initial assembly. Thus, both a jamming between the perforated blade disc and the cutting blade as well as an uneven wear of the cutting blade and perforated blade disc is avoided.

In addition, due to the invention, the bending stress on the hoses is reduced, since the end wall and thus also the hoses no longer have to be moved. Thus, in addition, due to the lower stress, the service life of the hoses connected to the distributor device is increased.

Further, an additional time saving during maintenance, in particular, when replacing the cutting blades, is achieved by the fact that any additional attachments arranged directly on the end wall, such as all the electrical sensor and pneumatic valve connections, can remain permanently connected to the end wall after initial assembly, which must be released when the end wall is moved away. This offers an advantage in particular because the number of such connections has increased sharply in the past and a further increase in the number of such connections is to be expected in the future for distributor devices of this type, whereby the loosening and connecting of these connections is associated with considerable effort due to the large number.

In a first preferred embodiment, it is provided that the clamping device is adjustable between a clamping state and a release state, wherein in the clamping state there is a first contact force between the cutting blade and the perforated blade disc, and in the release state there is a second contact force between the perforated blade disc and the cutting blade, wherein the second contact force is less than the first contact force, in particular zero.

In this embodiment, the clamping device can be set either manually or by means of a tool to the clamping state or to the release state. Thereby, in the clamping state, the cutting blade is pressed onto the perforated blade disc so that a force is generated between the perforated blade disc and the cutting blade. In the release state, the force between the perforated blade disc and the cutting blade is reduced so that there is either a significantly lower force than in the clamping state or no force at all between the perforated blade disc and the cutting blade. Thereby, it is particularly preferred that the clamping device has at least one helical spring, in particular, a torsion spring, wherein the helical spring is connected to at least one, preferably rotatable, in particular, eccentrically rotatably mounted, pressure element and a holder for transmitting a moment, and the pressure element is connected to the cutting blade in the clamping state. By means of an eccentric rotation axis of the pressure element, it can be achieved that the contact force is kept constant in the clamping state, even if the cutting blades wear and their position shifts relative to the rotor due to abrasion.

According to a further preferred embodiment, it is provided that the pressure element is positively connected to a locking element, preferably designed as a locking pawl or a cotter pin, and is held in the release state.

By fixing the locking element in the release state, it is achieved that there is little or no force between the cutting blade and the perforated blade disc. The rotor is then, provided that the connection to the connecting part or the blade drive shaft has been released, radially movable and thus removable from the distribution chamber. Thereby, the locking pawl engages either directly in the pressure element, in particular, in a position provided for this purpose, preferably formed as a notch, or in an element connected to the pressure element. If a cotter pin is used to hold the pressure element in the release state, there is preferably at least one hole in the pressure element for this purpose, and preferably also at least one hole in a further element such as a holder. Thus, the cotter pin can be inserted through the hole or the holes to block the pressure element in direction of rotation.

Thereby, it is particularly preferred that the pressure element is coupled to a rotatable shaft, wherein the shaft is connected to a bracket and has an interface for rotating the shaft.

Thereby, the pressure element is coupled to the rotatable shaft in such a way that a rotation of the shaft leads to a rotation of the pressure element. The shaft is preferably positioned at its ends in bearings provided for this purpose in the bracket, so that the shaft is essentially rotatably movable. The interface, for example designed in the form of an internal hexagon, serves to enable the shaft to be rotated in the desired direction of rotation, in particular, in the opposite direction to the torque acting through an existing spring, in particular, in order to move the pressure element into the release state.

A further preferred embodiment of the distributor device is characterized by a second perforated blade disc with several outlet openings that connect the chamber interior space to several second connection ports, a second cutting blade which is connected to the rotor and has at least one cutting edge which rests against the second perforated blade disc and is movable relative to this perforated blade disc by means of the rotor, wherein the rotor is arranged between the first and the second perforated blade disc, and the distribution chamber has a second end wall on which the several second connection ports are arranged.

In this embodiment, the chamber interior space is axially restricted by two perforated blade discs which are preferably arranged opposite one another and enclose the chamber interior space between them. This design allows the number of outlet openings and thus also the number of hoses connected to the distribution chamber to be substantially increased, in particular, doubled, because there are two end walls with connection ports to which hoses are attached. Thereby, the distribution chamber can, for example, be cylindrically designed, wherein the perforated blade discs each are arranged on the end face of the cylindrical distribution chamber. It is preferred here if the first and the second perforated blade disc are of identical design. Thereby, it is also preferred if the first and the second cutting blade are of identical design.

The rotor with the two cutting blades can be removed radially in this embodiment, so that an end wall disassembly is not necessary to perform maintenance work with rotor removal. Just as in the previously explained embodiment with one cutting blade, a small axial movement of the rotor can be provided and necessary, but this is less than 5 cm, in particular, less than 2.5 cm or even less than 1 cm. Consequently, the axial movement is also not used here to pull the rotor axially off a shaft which extends over the entire axial rotor length or the substantial part of the rotor length. Instead, if necessary, only a small axial offset is realized to allow radial removal. In addition and upstream of the axial offset, an axial displacement of the cutting blades towards each other can take place, by which the axial distance between the two opposite cutting blades arranged on the rotor is reduced. This prevents a force- or form-fit of the rotor within the housing and enables an essentially force-free radial removal of the rotor from the housing.

Still further, it is preferred that the rotor is mounted such that the first cutting blade is movable in rotation along a movement path, preferably about the drive shaft axis.

Thereby, the movement of the rotor moves the cutting blade in such a way that the cutting edge moves along the outlet openings in the perforated blade disc and a shearing action is created between the cutting blade and the perforated blade disc, thereby breaking up the solids in the liquid. The rotor is thereby preferably connected to the connecting part, which is connected to the blade drive shaft.

Thereby, it is particularly preferred that the rotor and the cutting blade are mounted in such a way that a rotational movement of the cutting blade is superimposed on the movement of the rotor on the movement path.

In this embodiment, the cutting blade is movably connected to the rotor, preferably rotatably, so that the cutting blade can perform a movement that deviates from the rotor. In particular, the cutting blade can perform a passive movement that adapts based on the loads acting on the cutting blades. In this way, the loads on the cutting edges and thus the wear on the cutting edges can be reduced.

A further embodiment provides that the connecting part for transmitting a torque is connected to the blade drive shaft and/or to the rotor by means of at least one screw connection.

Thereby, in addition to or instead of a shaft-hub connection between the blade drive shaft and the connecting part, a screw connection can be provided for the connection between the blade drive shaft and the connecting part. Furthermore, it is preferred if the connecting part is connected to the rotor by means of a screw connection, preferably by means of three or more screws, in order to transmit the torque from the connecting part to the rotor.

Still further, it is preferred that the blade drive shaft is connected to the connecting part in a torque-resistant manner with respect to the drive shaft axis by means of a shaft-hub connection, and the connecting part is connected to the rotor.

Thereby, the connection between the blade drive shaft and the drive shaft axis is designed in such a way that the torque can be transmitted to the rotor. In this case, the blade drive shaft transmits a torque preferably to the connecting part, wherein the connection between the blade drive shaft and the connecting part is preferably designed as a shaft-hub connection, particularly preferably as a form-fit connection.

A preferred embodiment provides that the width of the opening in the direction of the drive shaft axis is at least as great as the sum of the length of the rotor and the length of the first cutting blade and preferably the length of the second cutting blade in the direction of the drive shaft axis, and the height of the opening, in the direction perpendicular to the drive shaft axis, is at least as great as the minimum height of the rotor projected perpendicular to the cross-sectional area of the opening, preferably at least as great as the diameter of the perforated blade disc about the drive shaft axis.

The opening is designed in such a way that the rotor can be removed and inserted through the opening. This offers the advantage that the rotor with the cutting blade can be removed radially from the distribution chamber without having to remove the end wall from the distribution chamber.

Another preferred embodiment is characterized by a mounting device which is detachably connectable to the distribution chamber, preferably on the side wall, in particular, on the edge of the opening, on at least one point, wherein the mounting device comprises a holding device which is releasably connected to the rotor for securing the rotor to the mounting device, and preferably a mounting opening to the chamber interior space.

Thereby, the mounting device is detachably connectable to the distribution chamber, for example, by means of a screw connection, to the distribution chamber, in particular, to the side wall. Thereby, the mounting device can be connected to the distribution chamber in a wide variety of ways. These include, for example, the connection by means of a hook-in or the connection by means of snap fasteners. The mounting device can be attached to the distribution chamber and thereby enables a reception of the rotor. In this case, the rotor can preferably be detachably connected to the holding device of the mounting device. The rotor with the cutting blade connected thereto can then be removed from the distribution chamber by means of the mounting device and reinserted into the distribution chamber. The holding device is adapted to be connected to the rotor so that the rotor can be removed from the distribution chamber.

It is particularly preferred that the connecting part is removable from the distribution chamber through the mounting opening.

Thereby, the mounting opening in the mounting device is designed in such a way that the connecting part can be removed through this mounting opening. Furthermore, the mounting opening is designed in such a way that a tool for releasing the connecting part can be inserted into the distribution chamber through the mounting opening in order to release the connecting part. Preferably, the mounting device can remain connected to the distribution chamber during this process.

Still further, it is preferred that the holding device is fixable with the rotor for mounting the rotor on a position on the movement path.

Thereby, the holding device is configured such that when the mounting device is attached to the distribution chamber, it holds the rotor in a position in which the rotor can be connected to the connecting part so that the rotor is in an installation position.

According to a further embodiment, it is preferred that the first end wall of the distribution chamber is connected to the side wall by a material bond, in particular, by means of a welded joint, or by a form-fit.

One advantage of this embodiment is that the rigidity is significantly increased compared to an embodiment in which the end wall is connected to the distribution chamber by means of a screw connection. Preferably, a material bond connection, in particular, a welded connection, is present between the end wall and the distribution chamber. In a further preferred embodiment, a form-fit connection is present between the end wall and the side wall.

In another embodiment, it is preferred that the first end wall of the distribution chamber is attached to the side wall with several screw connections.

Thereby, several, in particular three to twenty, particularly preferably five to twelve, screws are used to detachably connect the end wall to the distribution chamber.

In another preferred embodiment, an O-ring for sealing the distribution chamber is arranged between the first end wall and the side wall.

Thereby, the O-ring is located in a groove provided for this purpose in the distribution chamber and/or in the end wall. With the O-ring the connection between the distribution chamber and the end wall can be sealed in such a way that no liquid can escape between the distribution chamber and the end wall.

In another preferred embodiment, the first cutting blade has a shape with several, preferably three, rounded corners, wherein the distance between at least one point on the outer contour of the cutting blade and the center of the cutting blade is at least as great as the distance between the center of the perforated blade disc and the outer edge of one of the outlet openings, wherein the distance between at least one point on the outer contour of the cutting blade and the center of the cutting blade is at least as small as the distance between the center of the perforated blade disc and the inner edge of one of the outlet openings.

Thereby, the cutting blade is preferably designed in such a way that, when the cutting blades are in contact with the perforated blade disc in each position of the cutting blade, several outlet openings in the perforated blade disc are covered by the cutting blade, in particular, covered in such a way that no liquid can escape through these outlet openings in the sense of the application. Further, the cutting blade is preferably designed such that when the cutting blades rest against the perforated blade disc in any position of the cutting blade, several outlet openings in the perforated blade disc are at least not completely covered by the cutting blade, so that these outlet openings in the perforated blade disc are connected to the distribution chamber and liquid can escape through these outlet openings.

According to another aspect of the present invention, the foregoing problem is solved by a method for maintaining a distributor device for solids-containing liquids, wherein the maintenance method comprises: Disconnecting a connection between a rotor and a drive shaft, which are coupled in a distribution chamber for transmitting a torque, so that the rotor is movable in the distribution chamber, and radial removal of the rotor from the distribution chamber through an opening which is located in the side wall of the distribution chamber.

In this method, in one step, the connection between the rotor and the drive shaft is disconnected, preferably by disconnecting the connection between a connecting part and the drive shaft and the connection between this connecting part and the rotor. When the connection between the rotor and the blade drive shaft is disconnected, the rotor can be moved radially within the distribution chamber. In a further step, the rotor is removable from the distribution chamber, wherein the rotor can be guided through the opening and thus moved radially out of the distribution chamber.

Thereby, preferably, in particular, loosening the connection between a perforated blade disc and the chamber interior space, and removal of the perforated blade disc from the distribution chamber through the opening.

Here, the connection between a perforated blade disc and the distribution chamber can be released inside the distribution chamber and the perforated blade disc can be removed from the distribution chamber through the opening, which is preferably located in the side wall.

Still further preferred is the connecting of a manufacturing aid to the distribution chamber, wherein the manufacturing aid has a stop for mounting an end wall. The manufacturing aid serves as an auxiliary element for mounting the end wall on the distribution chamber.

Thereby, the manufacturing aid is connected to the distribution chamber in such a way that the manufacturing aid enables improved assembly of the end wall. The manufacturing aid is placed and fixed inside the distribution chamber.

Still further is preferred the attaching of the end wall to the distribution chamber so that the end wall touches the manufacturing aid and is arranged in a plane that is perpendicular to a drive shaft axis.

Thereby, during an assembly process, a stop of the manufacturing aid is preferably in contact with the end wall in such a way that the end wall is fixed to the distribution chamber in the desired orientation. In this way, the manufacturing aid facilitates correct positioning of the end wall. Further, a disadvantageous inclination of the end wall can be prevented by using the manufacturing aid.

Still further is preferred the tightening of several screw connections to close the distribution chamber, wherein a defined torque or a defined angle of rotation is applied to each of the screw connections, preferably by using a suitable tool, such as, for example, a torque wrench.

Thereby, the screws are preferably tightened in a specific sequence so that the seal between the distribution chamber and the end wall is not damaged and, in addition, the end wall is in the desired position when in the connected state. For the assembly, a certain torque should preferably be applied to the screws or the screw should be rotated through a certain angle. For this purpose, preferably a tool suitable for this purpose should be used.

This controlled tightening of the screw connections ensures that the screws of the screw connection are subjected to essentially equal torques and can consequently also be loosened with correspondingly equal torques. Due to this process, a circumferentially constant gap, in which a seal can be arranged, between the end wall and the distribution chamber is achieved. Furthermore, the seal between the distribution chamber and the end wall is uniformly loaded along the seal and, accordingly, there is a uniform pressure over the entire contact surface between the end wall and the distribution chamber.

BRIEF DESCRIPTION OF THE DRAWINGS

A preferred embodiment of the invention is described with reference to the accompanying figures. It shows.

DETAILED DESCRIPTION OF THE EMBODIMENTS

Figure 1:
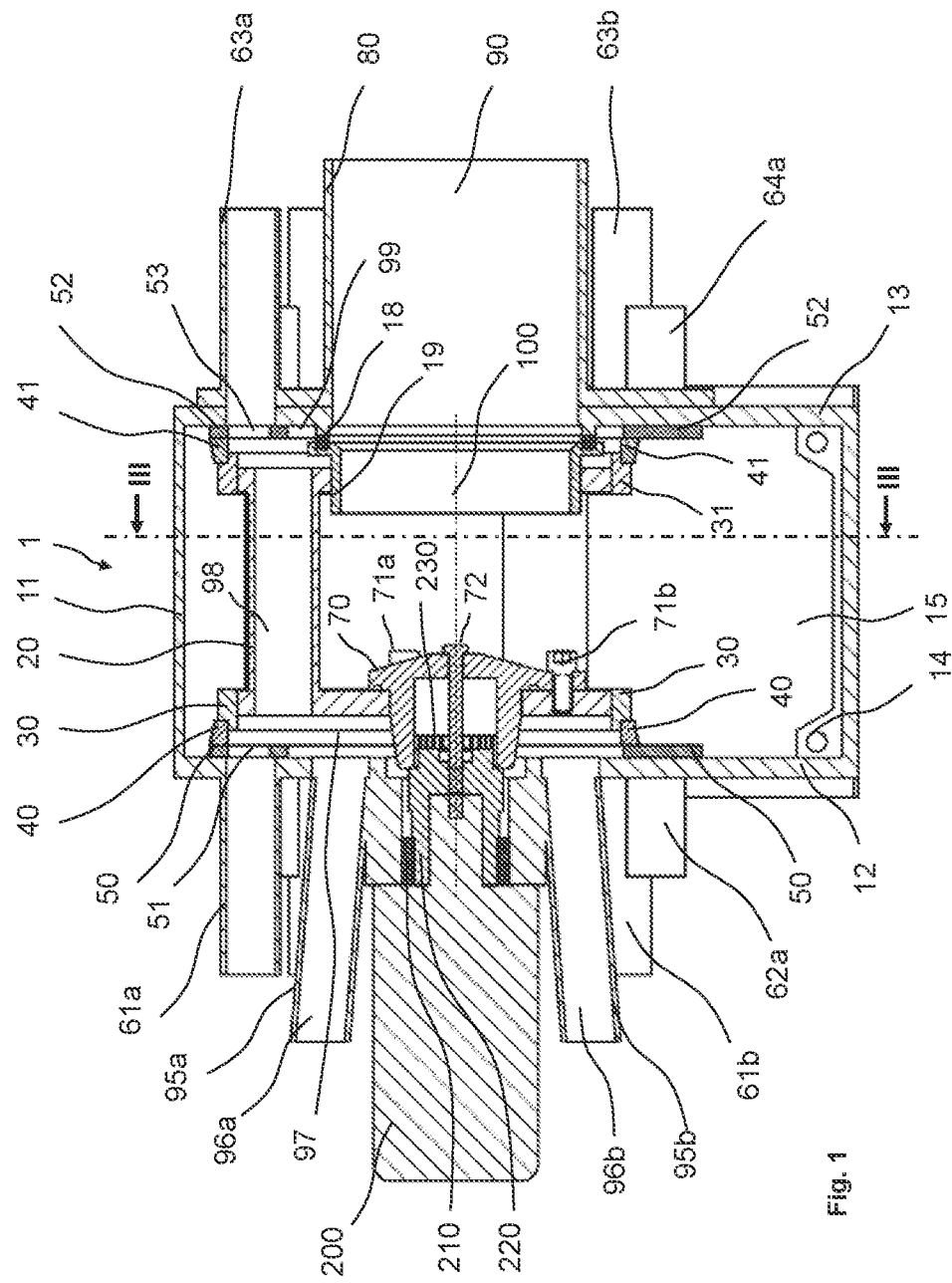
FIG. 1 is a longitudinal cut side view of a preferred embodiment of a distributor device according to the invention.
Figure 2A:
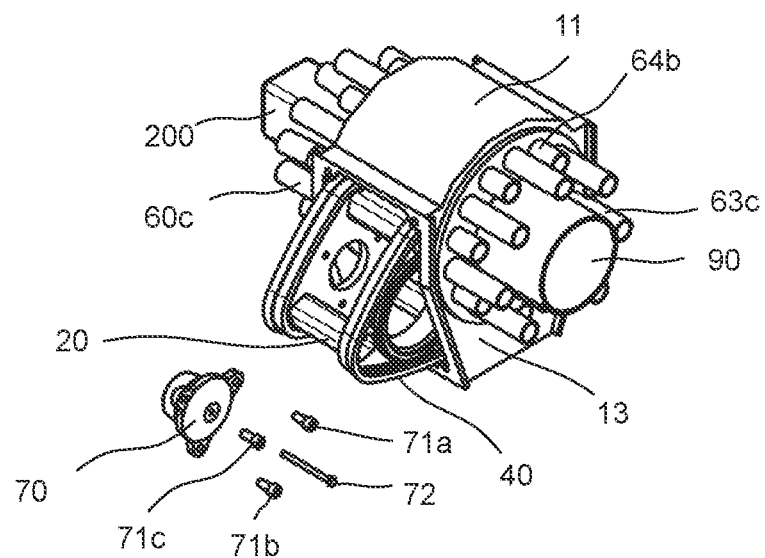
FIG. 2a is a three-dimensional view of the distributor device with the connecting part removed and the rotor semi-extended.
Figure 2B:
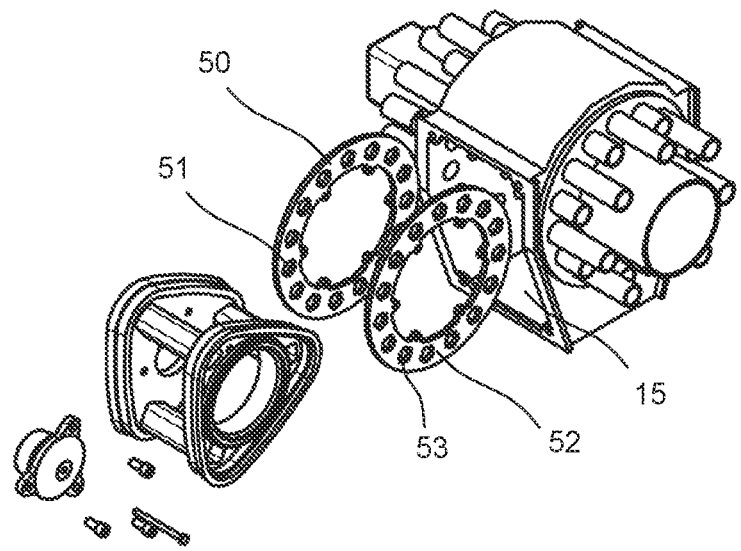
FIG. 2b is a three-dimensional view of the distributor device with the connecting part removed, the rotor removed, and the perforated blade disks removed.

In FIG. 1, a distributor device 1 is shown which has a substantially cylindrical shape and has a distribution chamber 11 which has a first end wall 12 and a second end wall 13, as well as an opening 15 in a side wall, which, in particular, can also be seen in FIG. 2b. The end walls 12, 13 are arranged laterally to the side wall. At the edge of the opening 15 there is a mounting hole 14 for mounting a mounting device (not shown) or for mounting a cover (not shown) for closing the opening. Attached to the distribution chamber 11 is an inlet port 80 which has an inlet opening 90 through which the solids-containing liquid is introduced into the distribution chamber 11.

The blade drive shaft 220 is connected to a drive motor 200 by means of a screw 72, so that torque is transmitted from the drive motor 200 to the blade drive shaft 220 via a shaft-hub connection. The screw 72 fixes the rotor in its axial position. The blade drive shaft 220 performs a rotation about the drive shaft axis 100 and is supported by a bearing 210. A connecting part 70 is connected to the blade drive shaft 220 via the screw 72. The torque from the blade drive shaft 220 is transmitted to the connecting part 70 by means of a shaft-hub connection, preferably a form-fit connection, for example, designed as a spline 230. The connecting part transmits the torque to a rotor 20 and is connected to the rotor by three screws 71a, 71b, 71c.

The rotor 20 thus performs a rotational movement about the drive shaft axis 100. In this case, the drive shaft axis 100 is not arranged centrally in the distribution chamber, but is positioned somewhat elevated so that larger solid parts, for example, stones, can be collected and accumulated under the rotor in the lower part of the distribution chamber. The rotor is connected to a first cutting blade 30 with the cutting edge 40, wherein the cutting edge 40 rests against the first perforated blade disc 50, with outlet openings 51 located therein. The shearing action between the cutting edge 40 and the perforated blade disc 50 causes the solids to be broken up. The solids-containing liquid then flows from the distribution chamber 11 through the outlet openings of the perforated blade disc 51 further through a plurality of connection ports 61a, 61b, . . . and 62a, . . . , wherein the connection ports are arranged in a circular shape on the first end wall 12, and the length of the connection ports is designed alternately shorter and longer to facilitate a connection of hoses to the connection ports.

On the opposite side of the rotor 20, the rotor 20 is connected to a second cutting blade 31 with the cutting edge 41, wherein the cutting edge 41 rests against the second perforated blade disc 52, with outlet openings 53 located therein. In this case, the shearing action between the cutting edge 41 and the perforated blade disc 52 also causes the solids to be broken up. The solids-containing liquid then flows from the distribution chamber 11 through the outlet openings 53 of the perforated blade disc 52 further through a plurality of connection ports 63a, 63b, . . . and 64a, . . . , wherein the connection ports are arranged in a circular shape on the second end wall 13 and also here the length of the connection ports is designed alternately shorter and longer to facilitate a connection of hoses to the connection ports.

In addition to the connection ports, air inlet ports 95a, 95b, . . . are arranged in a circular shape on the first end wall 12. Air inlet openings 96a, 96b, . . . in the air inlet ports allow ambient air to enter the air-conducting space 97 which is located between the rotor 20 and the first end wall 12. The ambient air is thus directed through the air inlet ports 95a, 95b, . . . into the air-conducting space 97 and then through the outlet openings in the first perforated blade disc 51 further through the connection ports 61a, 61b, . . . and 62a, . . . . In addition, the air is directed through a cavity in the rotor 98 to the opposite side so that the ambient air is passed from the air-conducting space 99 through the outlet openings in the second perforated blade disc 53 further through the connection ports 63a, 63b, . . . and 64a, 64b, . . . . The air-conducting chamber 99 is sealed from the chamber interior space by means of a seal carrier 19 and a seal 18 between the seal carrier 19 and the second end wall 13, so that the liquid located in the distribution chamber cannot enter the air-conducting space 99.

In FIG. 2a, the distributor device with the connecting part 70 removed and the rotor 20 half-extended is shown. To remove the rotor 20, first the screw 72 that connects the connecting part 70 to the blade drive shaft 220 is loosened. Then the screws 71a, 71b, 71c connecting the connecting part 70 to the rotor 20 are loosened. Then the screws 72 as well as 71a, 71b, 71c and the connecting part 70 can be moved out of the distribution chamber 11 through the opening 15 in the side wall. Subsequently, and after the clamping device 500 (further discussed below) has been set in the release state, the rotor 20 can be moved radially and thus guided radially through the opening 15 in the side wall. In FIG. 2b, the rotor 20 with the cutting blades 30, 31 are already removed and the perforated blade discs 50 and 52 can also be removed radially from the distribution chamber through the opening 15 in the side wall.

Figure 3:
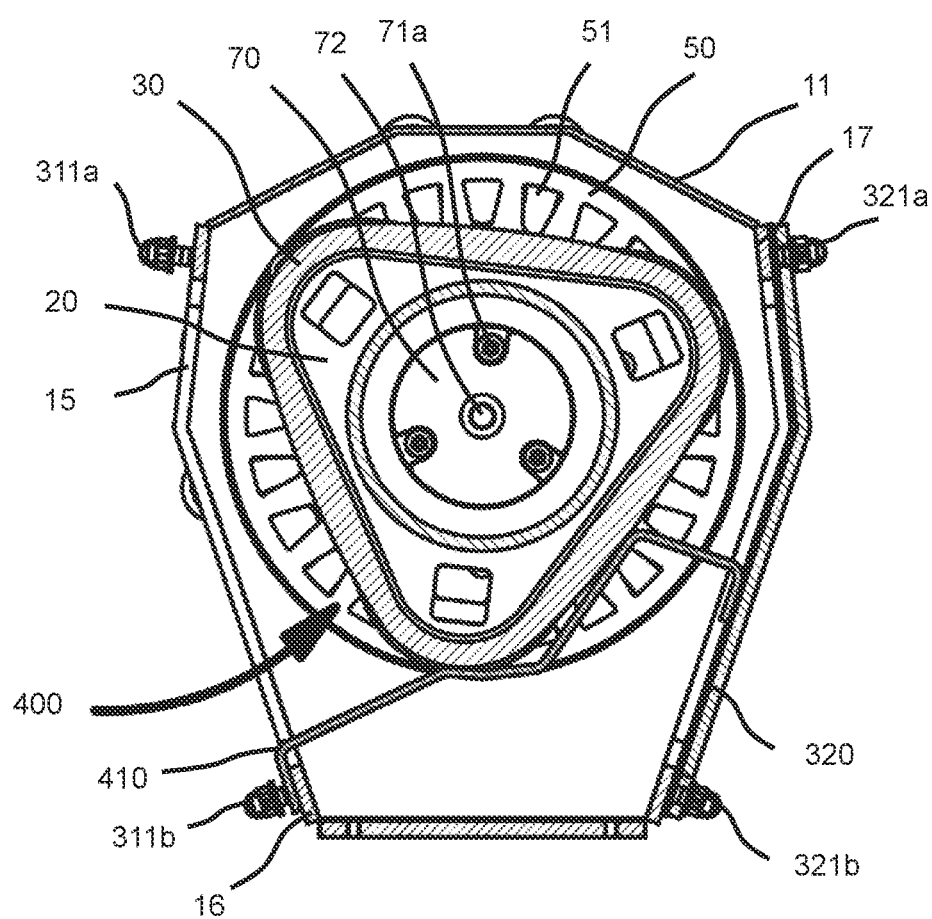
FIG. 3 is a cross-sectional view of the first preferred embodiment showing a holding device along line III-III in FIG. 1.

In FIG. 3 a cross-sectional view of the distributor device is shown, wherein a holding device 410 is connected to the side wall 16. The holding device 410 holds the rotor 20 with the cutting blade 30 located thereon in a position in which the connecting part with the rotor 20 and the blade drive shaft 220 can be mounted or demounted. The rotor 20 can, for example, together with the holding device 410, be brought into the desired position by inserting (see arrow 400) through the opening 15 in the side wall into the distribution chamber 11 so that the cutting edge 41 rests against the perforated blade disk 50. The holding device 410 is thereby connected to the side wall 16 of the distribution chamber 11 by means of a screw connection 311b. Furthermore, the holding device 410 is connected to a cover 320 which closes a second opening in the second side wall 17 by means of a screw connection 321a, 321b. When the rotor 20 is held in the desired position by the holding device 410, the connecting part 70 can be connected to the rotor 20 and the blade drive shaft 220 and can be connected to the blade drive shaft 220 by the screw 72 and to the rotor 20 by the screws 71a, . . . . After the connecting part has been connected to the rotor 20 and the blade drive shaft 220, the holding device 410 can be removed through the opening 15 from the distribution chamber 11. The opening can now be closed with a cover (not shown), which is fastened to the side wall 16 of the distribution chamber 11 by means of a screw connection 311a, 311b.

Analogously to the existing cover 320, which closes the opening in the side wall 17, wherein the cover is fixed with the screws 321a, 321b, the opening 15 of the side wall 16 can also be closed with such a cover, wherein the cover is fixed with the screws 311a, 311b. In this exemplary embodiment, therefore, openings are present in both side walls, each of which are closeable by means of a cover.

Figure 4A:
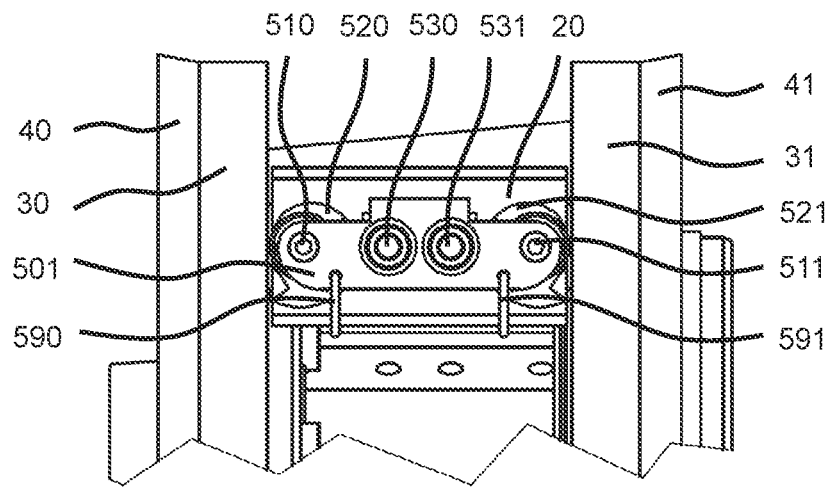
FIG. 4a is a detailed view of an installed clamping device in the release state.
Figure 4B:
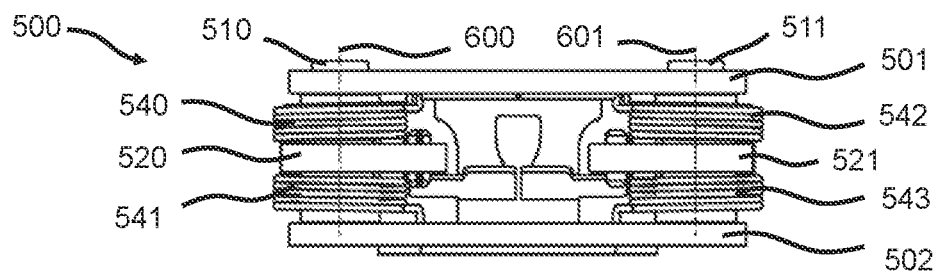
FIG. 4b is a top view of the clamping device.

In FIGS. 4a-e, several views of the clamping device 500 are shown. In FIG. 4a, the clamping device is shown in the installed state on the rotor 20 in the release state. Thereby, the clamping device 500 comprises fastening screws 530 and 531 which are located in holes 535 in the bracket 501. The fastening screws thus connect the clamping device 500 to the rotor 20. Thereby, the clamping device 500 has pressure elements 520 and 521, each of which is rotatably coupled on a shaft about the axes 600 and 601. Thereby, the shafts are each connected by two brackets 501 and 502, which may be separate components or an integral component. The shafts each have an interface 510 and 511 designed as an internal hexagon, with which the shaft and thus the pressure elements can be rotated to the desired position, for example, by means of a hexagon socket wrench. The clamping device 500 has several torsion springs 540, 541, 542 and 543, wherein the torsion springs each being connected to an eccentrically rotatably mounted pressure element 520, 521 and a holder, brackets 501, 502, for transmitting a torque. In the clamping state, the pressure elements 520, 521 are then connected to the cutting blades 30, 31 and exert a force on them. This results in a contact force between the cutting edges 40, 41 and the perforated blade discs 50, 52. By means of an eccentrically rotatable movability of the pressure element, it can be achieved that the contact force is kept constant in the clamping state, even if the cutting blades 30, 31 wear and the cutting edges 40, 41 become smaller due to abrasion.

Figures 4C, 4D, 4E:
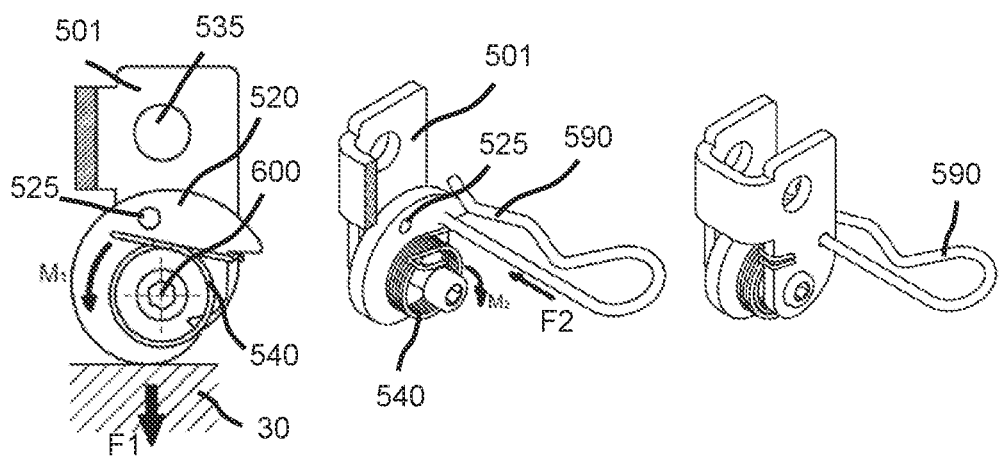
FIG. 4c is a detailed view of the clamping device with schematically shown contact force.
FIGS. 4d and 4e are two views of a section of the clamping device with functionality of a cotter pin.

In the release state, the pressure elements 520, 521 are held in a defined position by guiding cotter pins 590, 591 each through a hole 525 in the pressure element 520 and a hole in the holder 501. When the cotter pins 590, 591 are removed from the clamping device 500, the pressure elements cause a contact force between the pressure elements 520, 521 and the cutting blade 30 in contact therewith due to the applied torque M1. This then existing clamping state is shown in FIG. 4c. FIG. 4d schematically shows a turning back of the shaft and thus of the pressure element by applying a moment M2 by a tool. The pressure element can thus be rotated to a position in which the release state prevails and this position can subsequently be fixed with a cotter pin 590. In the release state, there is no contact force between the cutting edges 40, 41 and the perforated blade discs 50, so that the rotor 20 with the cutting blades 30, 31 connected thereto can be moved radially, provided that the connecting part is loosened and removed. In the clamping state, there is a contact force between the cutting edges 40, 41 and the perforated blade discs 50, so that when the rotor 20 and the cutting knives rotate, a shearing motion acts between the cutting edges 40, 41 and the perforated blade disc. Due to the shearing action the solids that are contained in the liquid are broken up, and the solids-containing liquid can be discharged via the hoses connected to the distributor device without clogging the hoses due to too large solid parts.

The invention claimed is:

1. A distributor device for solids-containing liquids, comprising:
   a distribution chamber with an inlet opening which leads to a chamber interior space of the distribution chamber, wherein the distribution chamber has a first end wall with a plurality of first connection ports and a first side wall arranged perpendicularly to the first end wall;
   a first perforated blade disc with a plurality of first outlet openings that connect the chamber interior space to the plurality of first connection ports;
   a blade drive shaft rotatably mounted about a drive shaft axis;
   a rotor coupled to the blade drive shaft for transmitting a torque about the blade drive shaft;
   a first cutting blade connected to the rotor and having at least one cutting edge which rests against the first perforated blade disc and is movable relative to the perforated blade disc by means of the rotor;
   a clamping device adapted to effect a contact force between the first cutting blade and the first perforated blade disc connected to the rotor;

a connecting part connecting the rotor and the blade drive shaft, which connecting part is detachably connected to the rotor and/or to the blade drive shaft, wherein a movement of the rotor is guided by the connecting part relative to the first perforated blade disc; and at least one closable opening located in the first side wall, wherein the opening is designed at least so large that the rotor is removable from the distribution chamber through the opening.

2. The distributor device according to claim 1, wherein: the clamping device is adjustable between a clamping state and a release state, such that in the clamping state there is a first contact force between the cutting blade and the perforated blade disc and in the release state there is a second contact force between the perforated blade disc and the cutting blade, wherein the second contact force is less than the first contact force.

3. The distributor device according to claim 2, wherein the second contact force is zero.

4. The distributor device according to claim 1, further comprising a pressure element that in the release state is positively connected to a locking element and is thereby held in the release state.

5. The distributor device according to claim 4, wherein: the pressure element is coupled to a rotatable shaft, wherein the rotatable shaft is connected to a bracket and has an interface for rotating the rotatable shaft.

6. The distributor device according to claim 1, further comprising:
a second perforated blade disc with a plurality of second outlet openings that connect the chamber interior space to a plurality of second connection ports; and
a second cutting blade connected to the rotor and having at least one cutting edge which rests against the second perforated blade disc and is movable relative to this perforated blade disc by means of the rotor;
wherein the rotor is arranged between the first and the second perforated blade disk, and the distribution chamber has a second end wall on which the plurality of second connection ports are arranged.

7. The distributor device according to claim 1, wherein: the rotor is mounted such that the first cutting blade is movable in rotation on a movement path about the drive shaft axis.

8. The distributor device according to claim 1, wherein: the rotor and the cutting blade are mounted such that a rotational movement of the cutting blade is superimposed on the movement of the rotor on the movement path.

9. The distributor device according to claim 1, wherein: the connecting part for transmitting a torque is connected to the blade drive shaft and/or to the rotor by means of at least one screw connection.

10. The distributor device according to claim 1, wherein: the blade drive shaft is connected to the connecting part in a torque-resistant manner with respect to the drive shaft axis by means of a shaft-hub connection, and the connecting part is connected to the rotor.

11. The distributor device according to claim 1, wherein: a width of the opening in the direction of the drive shaft axis is at least as large as the sum of the length of the rotor and the length of the first cutting blade; and
a height of the opening, in the direction perpendicular to the drive shaft axis, is at least as great as the minimum height of the rotor projected perpendicular to the cross-sectional area of the opening.

12. The distributor device according to claim 11, wherein the height of the opening is at least as great as the diameter of the perforated blade disc about the drive shaft axis.

13. The distributor device according to claim 1, further comprising:
a mounting device which is detachably connectable to the side wall of the distribution chamber proximate an edge of the opening on at least one point;
wherein the mounting device comprises a holding device which is releasably connected to the rotor for securing the rotor to the mounting device.

14. The distributor device according to claim 13, wherein: the connecting part is removable from the distribution chamber through the opening.

15. The distributor device according to claim 13, wherein: the holding device is fixable with the rotor for mounting the rotor on a position of the movement path.

16. The distributor device according to claim 1, wherein: the first end wall of the distribution chamber is connected to the side wall by a material bond comprising any of a welded joint, a form-fit, and/or force-fit.

17. The distributor device according to claim 1, wherein: the first end wall of the distribution chamber is fixed to the side wall with a plurality of screw connections.

18. The distributor device according to claim 1, further comprising:
an O-ring for sealing the distribution chamber arranged between the first end wall and the side wall.

19. The distributor device according to claim 1, wherein:
the first cutting blade has a shape with a plurality of rounded corners;
the distance between at least one point on the outer contour of the cutting blade and the center of the cutting blade is at least as great as the distance between the center of the perforated blade disk and the outer edge of one of the plurality of first outlet openings; and
the distance between at least one point on the outer contour of the cutting blade and the center of the cutting blade is at least as small as the distance between the center of the perforated blade disk and the inner edge of one of the plurality of first outlet openings.

20. A method for maintaining the distributor device according to claim 1, wherein the maintenance method comprises the steps of:
disconnecting a connection between the rotor and the drive shaft, which are coupled in the distribution chamber for transmitting the torque, so that the rotor is movable in the chamber interior space of the distribution chamber; and
radial removal of the rotor from the distribution chamber through the opening located in the side wall of the distribution chamber.

21. The maintenance method according to claim 20, wherein the maintenance method further comprises the steps of:
loosening the connection between the perforated blade disc and the chamber interior space;
removal of the perforated blade disc from the distribution chamber through the opening.

22. The maintenance method according to claim 20, wherein the maintenance method further comprises the step of:
connecting a manufacturing aid to the distribution chamber, wherein the manufacturing aid has a stop for mounting an end wall.

23. The maintenance method according to claim 22, wherein the maintenance method further comprises the step of:

attaching an end wall to the distribution chamber so that the end wall touches the manufacturing aid and is aligned in a plane that is arranged perpendicular to a drive shaft axis.

24. The maintenance method according to claim 20, wherein the maintenance method further comprises the step of:

tightening a plurality of connections to close the distribution chamber, wherein a defined torque or a defined angle of rotation is applied to each of the screw connections.

* * * * *